United States Patent
Miwa et al.

(10) Patent No.: US 10,009,492 B2
(45) Date of Patent: Jun. 26, 2018

(54) APPLICATION GENERATOR, APPLICATION GENERATION METHOD, AND COMPUTER PROGRAM

(71) Applicant: KONICA MINOLTA, INC., Chiyoda-ku, Tokyo (JP)

(72) Inventors: Kunihiro Miwa, Inazawa (JP); Masaaki Saka, Toyohashi (JP)

(73) Assignee: Konica Minolta Inc., Chiyoda-ku, Tokyo (JP)

( * ) Notice: Subject to any disclaimer, the term of this patent is extended or adjusted under 35 U.S.C. 154(b) by 0 days. days.

(21) Appl. No.: 15/420,163

(22) Filed: Jan. 31, 2017

(65) Prior Publication Data
US 2017/0251113 A1 Aug. 31, 2017

(30) Foreign Application Priority Data
Feb. 29, 2016 (JP) ................... 2016-036610

(51) Int. Cl.
| H04N 1/00 | (2006.01) |
| G06F 9/44 | (2018.01) |
| G06F 3/0488 | (2013.01) |
| G06F 3/0482 | (2013.01) |

(52) U.S. Cl.
CPC ..... H04N 1/00503 (2013.01); G06F 3/04886 (2013.01); G06F 9/44 (2013.01); H04N 1/00411 (2013.01); H04N 1/00435 (2013.01); H04N 1/00506 (2013.01); G06F 3/0482 (2013.01); H04N 2201/0094 (2013.01)

(58) Field of Classification Search
USPC .................................. 358/1.1–3.29
See application file for complete search history.

(56) References Cited

U.S. PATENT DOCUMENTS

| 8,891,096 | B2* | 11/2014 | Tomono | H04N 1/00392 |
| | | | | 358/1.13 |
| 2013/0268894 | A1* | 10/2013 | Jeon | G06F 3/04817 |
| | | | | 715/835 |
| 2014/0009407 | A1* | 1/2014 | Kim | G06F 3/0488 |
| | | | | 345/173 |

(Continued)

FOREIGN PATENT DOCUMENTS

JP 2011-197968 A 10/2011

*Primary Examiner* — Marcellus Augustin
(74) *Attorney, Agent, or Firm* — Buchanan Ingersoll & Rooney PC

(57) ABSTRACT

An application generator that generates a screen display application for causing an image forming apparatus to execute display processing includes: an acceptance section that accepts arrangement of any one of first objects each being prepared in advance for commanding to execute particular processing, to the screen, or accepts arrangement of a second object, and a third object arranged on another screen and to be associated with the second object, to the screen; a generation section that generates an application for displaying a screen on which one or both of the first object and the second object are arranged, for commanding to execute the particular processing relating to the first object when the first object is selected, and for giving notice of coordinates of the second object when the second object is selected; and an output section that outputs the screen display application and correspondence data.

19 Claims, 17 Drawing Sheets

(56) References Cited

U.S. PATENT DOCUMENTS

| | | | |
|---|---|---|---|
| 2015/0012853 A1* | 1/2015 | Chaudhri | G06F 3/04817 715/765 |
| 2016/0170638 A1* | 6/2016 | Funakawa | G06F 3/0488 715/773 |
| 2017/0070624 A1* | 3/2017 | Hanada | G03G 15/502 |

* cited by examiner

| API FUNCTION NAME | OBJECT IDENTIFIER | |
|---|---|---|
| OPEN_FILE | C001 | ~5A |
| SCAN | C002 | ~5A |
| DELETE_BOX | C003 | ~5A |
| ⋮ | ⋮ | |

| START COORDINATES | END COORDINATES | SCREEN NUMBER | CENTRAL COORDINATES |
|---|---|---|---|
| (Xs1, Ys1) | (Xb1, Ye1) | B001 | (Xc1, Yc1) |
| (Xs3, Ys3) | (Xe3, Ye3) | B001 | (Xc3, Yc3) |

FIG. 14

PROGRAM | BASIC SETTING | Language | JOB DISPLAY

YOU CAN COPY.
YOU CAN CHANGE THE NUMBER OF COPIES WITH THE NUMERIC KEY, THE [C] (CLEAR) KEY.

NUMBER OF COPIES: 1

COLOR
- AUTO COLOR
- FULL COLOR
- BLACK
- TWO-COLOR
- MONO-COLOR

GRAY LEVEL
LIGHT | DARK

SHEET
- AUTO
- 1  A3
- 2  A4
- 3  A4
- 4  A4
- B5

MAGNIFICATION  100.0%
- SMALL
- AUTO | ACTUAL SIZE
- B4▷A3 / B5▷A4 | A3▷B4 / A4▷B5
- A4▷B4 | B4▷A4
- A4▷A3 / B5▷B4 | A3▷A4 / B4▷B5
- 200.0% | 50.0%
- VARIABLE POWER

SETTING CONFIRMATION

ORIGINAL▷OUTPUT
- SINGLE-SIDE ▷ SINGLE-SIDE
- SINGLE-SIDE ▷ DOUBLE-SIDE
- DOUBLE-SIDE ▷ SINGLE-SIDE
- DOUBLE-SIDE ▷ DOUBLE-SIDE
- OPENING DIRECTION

PAGE AGGREGATION
- NONE | 2in1
- 4in1 | 8in1

ORIGINAL IMAGE QUALITY | FINISH | APPLICATION SETTING

| KEY NUMBER | NAME | OBJECT IDENTIFIER | START COORDINATES | END COORDINATES | SCREEN NUMBER | CENTRAL COORDINATES |
|---|---|---|---|---|---|---|
| A001 | COPY | | (Xs1, Ys1) | (Xe1, Ye1) | B001 | (Xc1, Yc1) |
| A002 | SCAN | C023 | (Xs2, Ys2) | (Xe2, Ye2) | | |
| A003 | FAX TRANSMISSION | | (Xs3, Ys3) | (Xe3, Ye3) | B003 | (Xc3, Yc3) |

5B

5C

| START COORDINATES | END COORDINATES | SCREEN NUMBER | CENTRAL COORDINATES |
|---|---|---|---|
| (Xs5, Ys5) | (Xe5, Ye5) | B001 | (Xc51, Yc51) |
| | | B001 | (Xc52, Yc52) |
| | | B002 | (Xc53, Yc53) |
| ⋮ | ⋮ | ⋮ | ⋮ |

APPLICATION GENERATOR, APPLICATION GENERATION METHOD, AND COMPUTER PROGRAM

The entire disclosure of Japanese Patent Application No. 2016-036610 filed on Feb. 29, 2016 including description, claims, drawings, and abstract are incorporated herein by reference in its entirety.

BACKGROUND OF THE INVENTION

Field of the Invention

The present invention relates to a technique for generating an application of an image forming apparatus, and in particular, relates to a layout technique for a screen to be displayed by the application.

Description of the Related Art

In recent years, an image forming apparatus has been widely used including various functions such as copying, scanning, faxing, or document management. Such image forming apparatus may also be referred to as a "multifunction machine" or a "multi function peripherals (MFP)."

In order to enable these functions to be used, a manufacturer creates an application and installs the application in the image forming apparatus in advance. The application fixedly installed in advance in this way may be referred to as a "native application."

Further, a web browser has been included in the image forming apparatus. It has become possible that various services are received by accessing a web server with the web browser and causing the web server to execute a web application.

In addition, a technique has been devised that is referred to as an "internal web server (IWS)" for providing a function of the web server to the image forming apparatus. A user or a company other than the manufacturer of the image forming apparatus can create a web application by using a well-known language (for example, Hypertext Markup Language (HTML), JavaScript (registered trademark), or Python) to install the web application in the image forming apparatus, and cause the IWS to execute the web application. The application executed by the IWS may be referred to as an "IWS application." In addition, a screen displayed by the IWS application may be referred to as a "custom screen" or a "customized screen."

Extensibility of the function of the image forming apparatus can be improved more easily than before, by providing the function of the web server such as the IWS in the image forming apparatus.

As a technique of the web server in the image forming apparatus, the following technique has been devised (JP 2011-197968A). The image forming apparatus includes a display section, a web browser for displaying hypertext type information on the display section, and a hypertext type data input/output module accessible from both the web browser and a web browser of an external device. The image forming apparatus determines whether access to the data input/output module is made via the web browser incorporated or the access is made via the web browser of the external device, and, depending on the determination result, creates different display data and transmits the created data to the web browser.

Further, a tool such as a user interface (UI) builder or a graphical user interface (GUI) has been widely used for laying out the custom screen. As for such tools, many objects (for example, a button representing a key) each associated with an application program interface (API) function are prepared in advance. A developer can lay out the custom screen by arranging a necessary one from these objects.

However, with a conventional tool for laying out the custom screen, there may be a case in which, for some API functions, an object is not prepared associated therewith. In addition, there may be a case in which a function for which the API function is not prepared is included in the image forming apparatus.

Therefore, with the conventional tool, there may be a case in which the custom screen for using a necessary function cannot be created.

SUMMARY OF THE INVENTION

In view of such problems, it is an object of the present invention to enable the developer to lay out the custom screen for using the necessary function more easily than before.

To achieve the abovementioned object, according to an aspect, there is provided an application generator that generates a screen display application for causing an image forming apparatus to execute display processing for displaying a screen on which one or more objects are arranged for giving commands, and the application generator reflecting one aspect of the present invention comprises: an acceptance section that accepts arrangement of any one of a plurality of first objects each being prepared in advance for commanding to execute particular processing, to the screen, or accepts arrangement of a second object different from the first object, and a third object arranged on another screen and to be associated with the second object, to the screen; a generation section that generates an application for displaying a screen on which one or both of the first object and the second object are arranged based on a result of acceptance by the acceptance section, for commanding to execute the particular processing relating to the first object when the first object is selected, and for giving notice of coordinates of the second object when the second object is selected, as the screen display application; and an output section that outputs the screen display application generated by the generation section and correspondence data indicating a correspondence between a position of the second object in the screen and the third object.

The other screen is preferably a screen that is used in a second application fixedly installed in advance in the image forming apparatus.

Further, the acceptance section preferably displays the other screen, and accepts one selected from objects arranged on the other screen, as the third object. Furthermore, the acceptance section preferably displays a list of the objects arranged on the other screen in a form of a hierarchical structure, and accepts one selected from the list, as the third object.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7 is a diagram illustrating an example of definition data;

FIG. 8 is a diagram illustrating an example of a coordinate transformation table;

FIG. 14 is a diagram illustrating an example of a copy command screen;

FIG. 15 is a diagram illustrating an example of attribute data;

DESCRIPTION OF THE PREFERRED EMBODIMENTS

Hereinafter, an embodiment of the present invention will be described with reference to the drawings. However, the scope of the invention is not limited to the illustrated examples.

Figure 1:
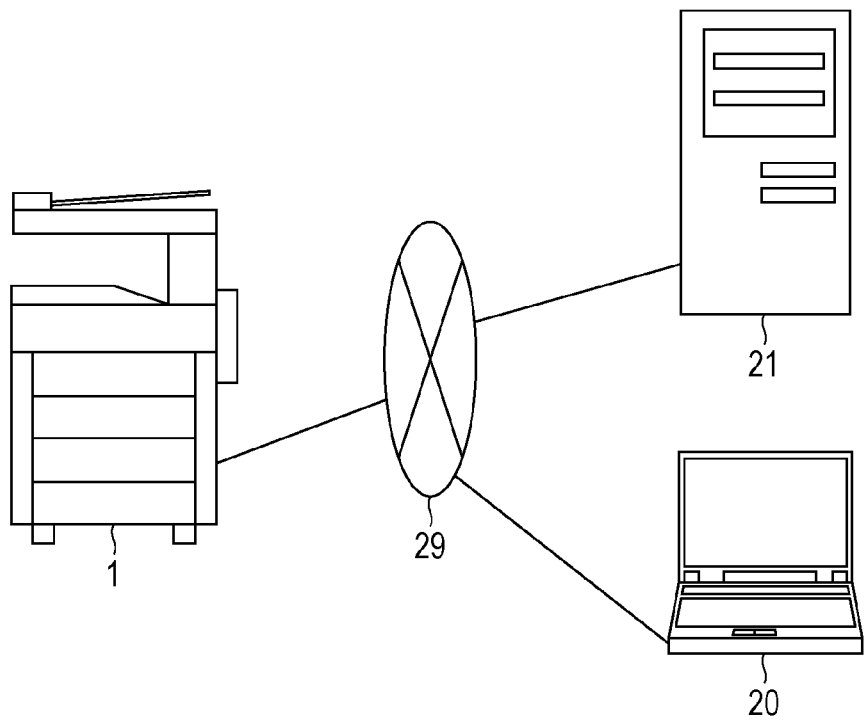
FIG. 1 is a diagram illustrating an example of an overall configuration of an image processing system.
Figure 2:
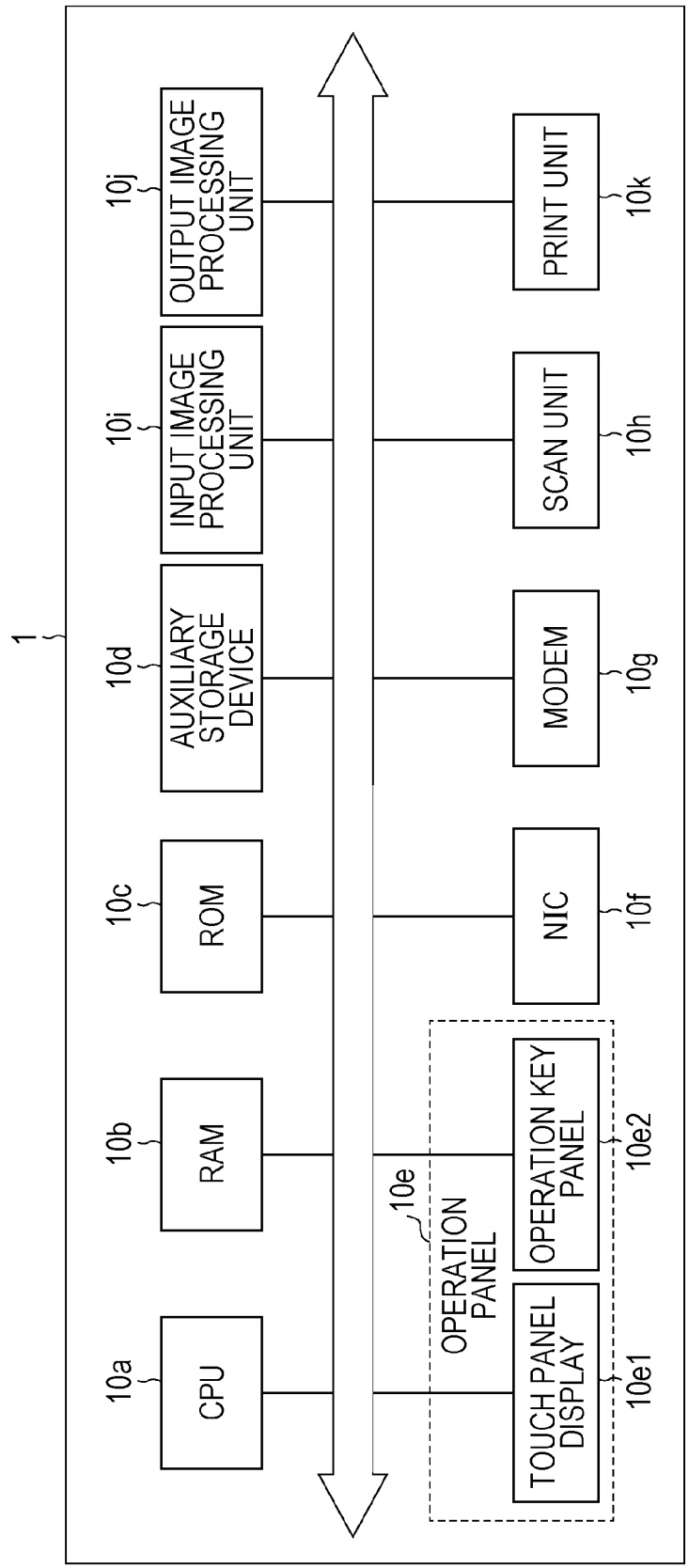
FIG. 2 is a diagram illustrating an example of a hardware configuration of an image forming apparatus.
Figure 3:
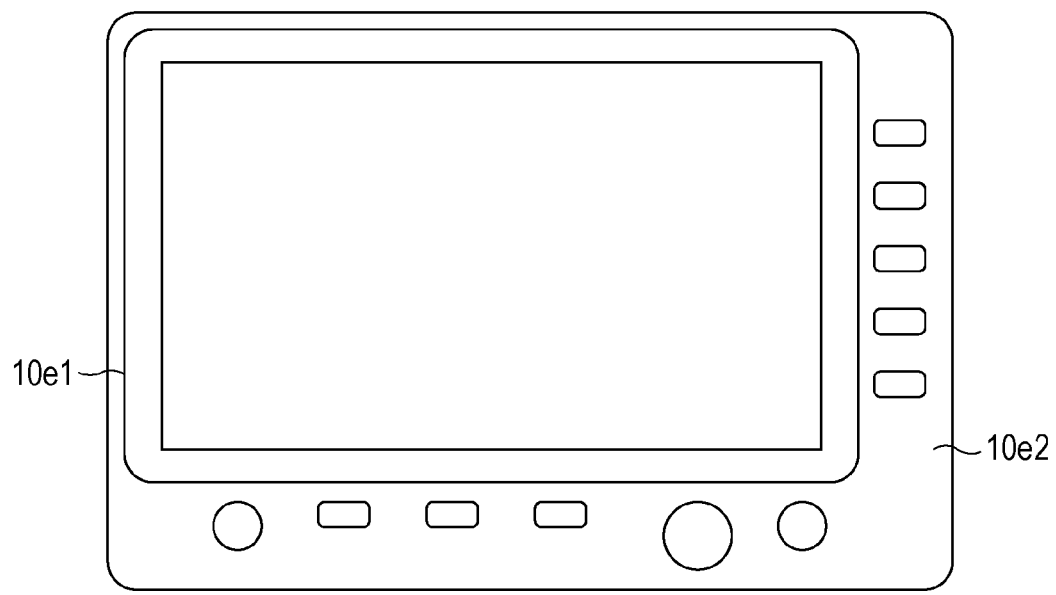
FIG. 3 is a diagram illustrating an example of an operation panel.
Figure 4:
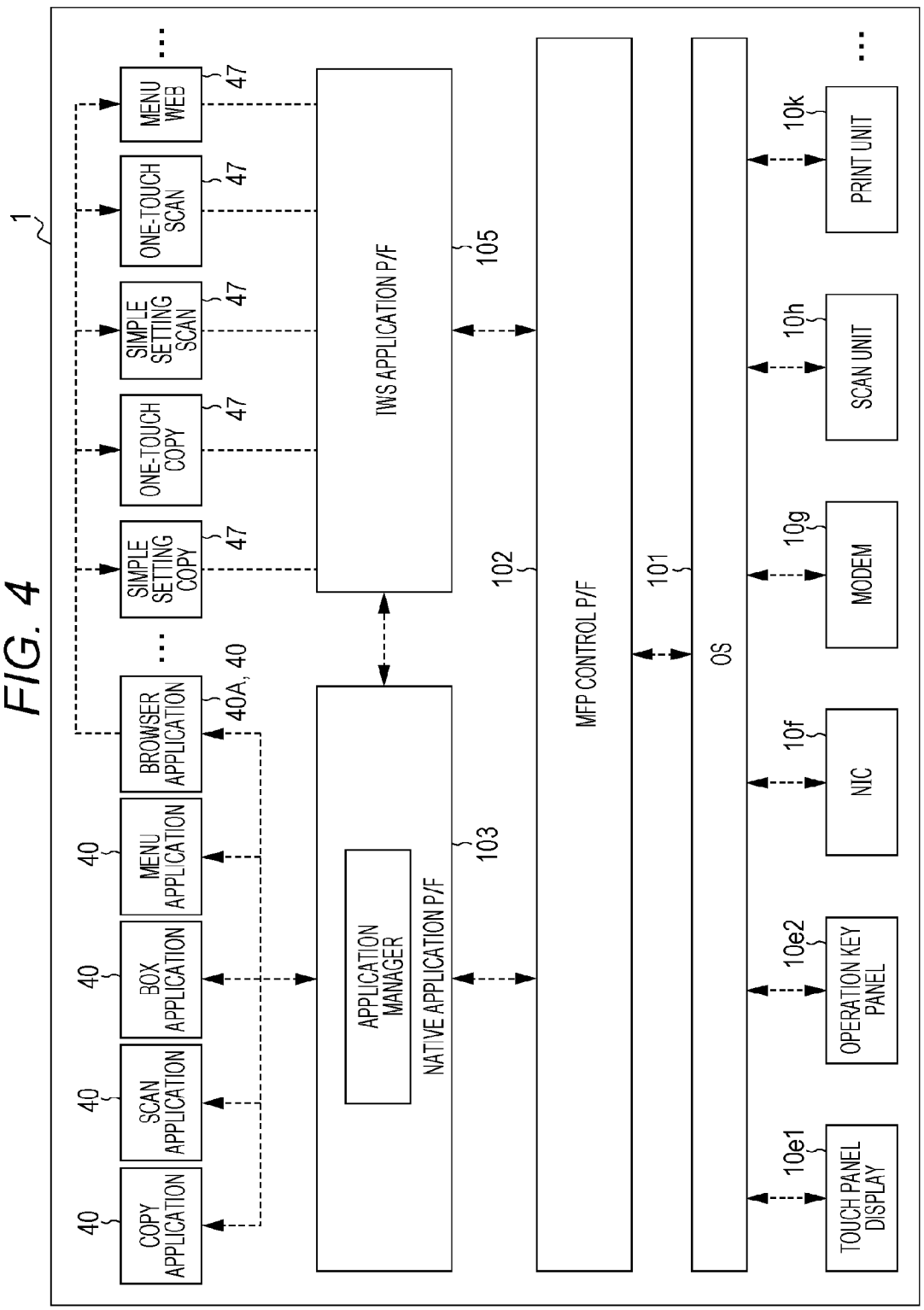
FIG. 4 is a diagram illustrating an example of a platform of the image forming apparatus.
Figure 5:
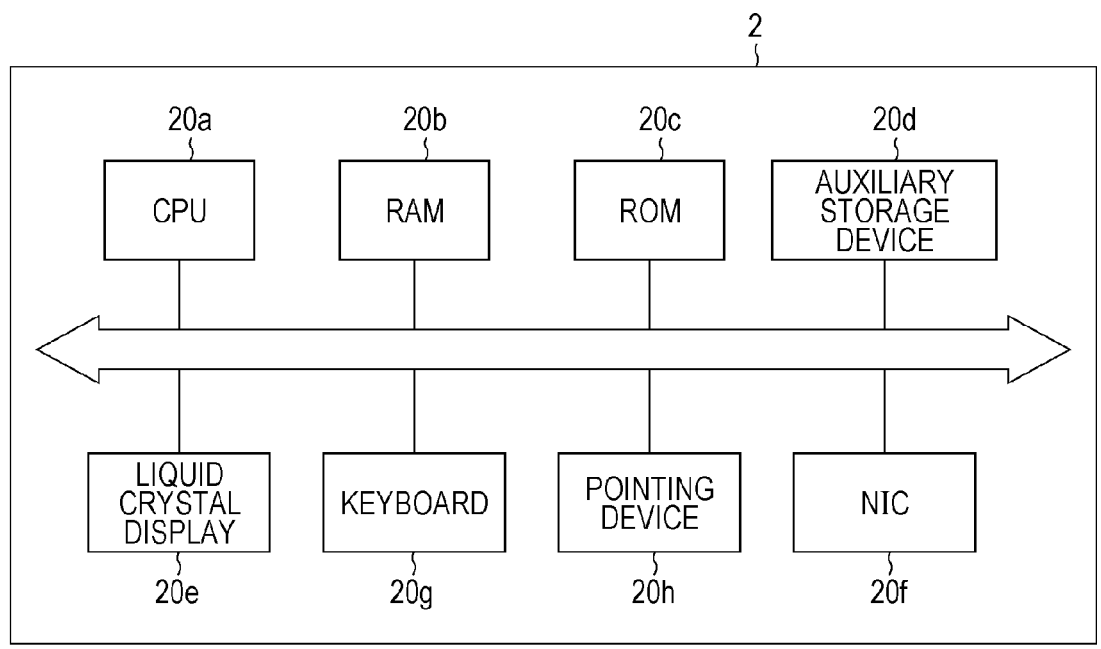
FIG. 5 is a diagram illustrating an example of a hardware configuration of a terminal device.

FIG. 1 is a diagram illustrating an example of an overall configuration of an image processing system 3. FIG. 2 is a diagram illustrating an example of a hardware configuration of an image forming apparatus 1. FIG. 3 is a diagram illustrating an example of an operation panel 10e. FIG. 4 is a diagram illustrating an example of a platform of the image forming apparatus 1. FIG. 5 is a diagram illustrating an example of a hardware configuration of a terminal device 20.

The image processing system 3 is configured by the image forming apparatus 1, the terminal device 20, a server device 21, a communication line 29, and the like, as illustrated in FIG. 1.

The image forming apparatus 1 is capable of communicating with the terminal device 20 and the server device 21 via the communication line 29. A local area network (LAN) line, the Internet, a public line, a dedicated line, or the like is used, as the communication line 29.

The image forming apparatus 1 is a device in which functions are aggregated providing services such as the copy, PC print, fax, scan, and box. The image forming apparatus 1 may be referred to as a "multi function peripherals (MFP)" or "multifunction machine."

The PC print service is a service for printing an image on a sheet on the basis of image data received from the terminal device 20. The PC print service may be referred to as "network printing" or "network print."

The box service is a service for each user to store and manage the image data and the like with one's own storage area by providing a storage area referred to as a "box" or a "personal box" for each user. The box corresponds to a "folder" or a "directory" in a personal computer.

The scan service is a service for reading an image drawn on a sheet to generate the image data, and storing the data in a recording medium or transmitting the data to another device.

The image forming apparatus 1 is configured by a central processing unit (CPU) 10a, random access memory (RAM) 10b, read only memory (ROM) 10c, an auxiliary storage device 10d, the operation panel 10e, a network interface card (NIC) 10f, a modem 10g, a scan unit 10h, an input image processing unit 10i, an output image processing unit 10j, a print unit 10k, and the like, as illustrated in FIG. 2.

The operation panel 10e is a user interface, and configured by a touch panel display 10e1, an operation key panel 10e2, and the like, as illustrated in FIG. 3.

The touch panel display 10e1 displays a screen indicating a message for the user, a screen for the user to input a command or information, a screen indicating a result of processing executed by the CPU 10a, and the like. In addition, the touch panel display 10e1 sends to the CPU 10a a signal indicating a position touched.

The operation key panel 10e2 is a so-called hardware keyboard, and configured by a numeric key, a start key, a stop key, a function key, and the like.

The NIC 10f communicates with another device using a protocol such as transmission control protocol/internet protocol (TCP/IP).

The modem 10g exchanges the image data with a facsimile terminal with a protocol such as G3.

The scan unit 10h reads the image drawn on the sheet set on a platen glass to generate the image data.

The input image processing unit 10i performs processing such as inclination correction, smear removal, or top/bottom correction, for the image input by the scan unit 10h or the like.

The output image processing unit 10j performs processing such as resolution adjustment or conversion to a monochrome image, for the image to be output by the print unit 10k.

The print unit 10k prints the image received from the other device by the NIC 10f, or the modem 10g, in addition to the image read by the scan unit 10h. The image is subjected to processing by the input image processing unit 10i or the output image processing unit 10j, as appropriate.

In the ROM 10c or the auxiliary storage device 10d, an operating system 101 and an MFP control platform 102 illustrated in FIG. 4 are installed as software for performing overall management or basic processing of the image forming apparatus 1, and providing the user interface. In order to provide a function of the operating system 101 or the MFP control platform 102 to an application, a native application platform 103 is prepared.

Further, in the auxiliary storage device 10d, a web browser and the like are installed, in addition to an application for providing the services described above such as the copy, scan, and box. These applications operate via the native application platform 103.

In addition, in the auxiliary storage device 10d, an IWS application platform 105 is installed that is software for an internal web server (IWS).

Further, in the auxiliary storage device 10d, one-touch copy, simple setting copy, one-touch scan, and simple setting scan, and the like are installed.

These applications are applications for providing the services described above in a simplified manner.

For example, with the one-touch copy application, the user is able to give a job command by only pushing a button representing a key arranged in the center of the screen. However, the copy job can be performed only in accordance with a predetermined condition. Alternatively, with the simple setting copy, the user is able to set only conditions of some particular items via the screen, and cause the image forming apparatus 1 to execute the copy job.

The user is able to use these applications via the web browser. In addition, these applications are executed by the IWS application platform 105, and results obtained by execution are provided to the user via the web browser, as appropriate.

Thus, some applications are executed via the native application platform 103, and others are executed via the IWS application platform 105.

Hereinafter, in order to distinguish these applications from each other, the application executed via the native application platform 103 is described as a "native application 40." On the other hand, the application executed via the IWS application platform 105 is described as an "IWS application 47." In addition, the web browser is described as a "web browser 40A." The web browser 40A is one of the native applications 40.

The server device 21 provides a file to the other device with a protocol such as a file transfer protocol (FTP), and manages a file received from the other device.

The terminal device 20 is a client for remotely using the services described above of the image forming apparatus 1. In addition, the terminal device 20 is also used for generating the IWS application 47. A personal computer, a smart phone, a tablet computer, or the like is used as the terminal device 20. Hereinafter, a case will be described as an example in which a laptop personal computer is used as the terminal device 20.

The terminal device 20 is configured by a CPU 20a, RAM 20b, ROM 20c, an auxiliary storage device 20d, a liquid crystal display 20e, an NIC 20f, a keyboard 20g, a pointing device 20h, and the like, as illustrated in FIG. 5.

A document to be printed, a screen for commanding printing, and the like are displayed in the liquid crystal display 20e.

The NIC 20f communicates with the image forming apparatus 1, and the like using a protocol such as the TCP/IP.

The keyboard 20g and the pointing device 20h are used by the user for inputting the information, the command, and the like.

The operating system, various applications, a driver of the image forming apparatus 1, and the like are stored in the ROM 20c or the auxiliary storage device 20d. Further, an application generation program 20P is stored.

The application generation program 20P is a program for generating the IWS application 47.

The program is loaded on the RAM20b if necessary, and executed by the CPU 20a. A hard disk, an SSD, or the like is used as the auxiliary storage device 20d.

The application generation program 20P includes a function of a known tool such as an integrated user interface (UI) builder, a UI builder, or a GUI builder, and an extended function, as a function for designing a screen of a graphical user interface (GUI).

Thus, during the work of generating the IWS application 47, a developer is able to create more easily than before a screen for designating a particular condition by only operating an object (may also be referred to as "control") such as the button, and executing the job, such as the screen of one-touch copy or the screen of simple setting copy described above. Hereinafter, this mechanism will be described.

[Platform]

Figure 6:
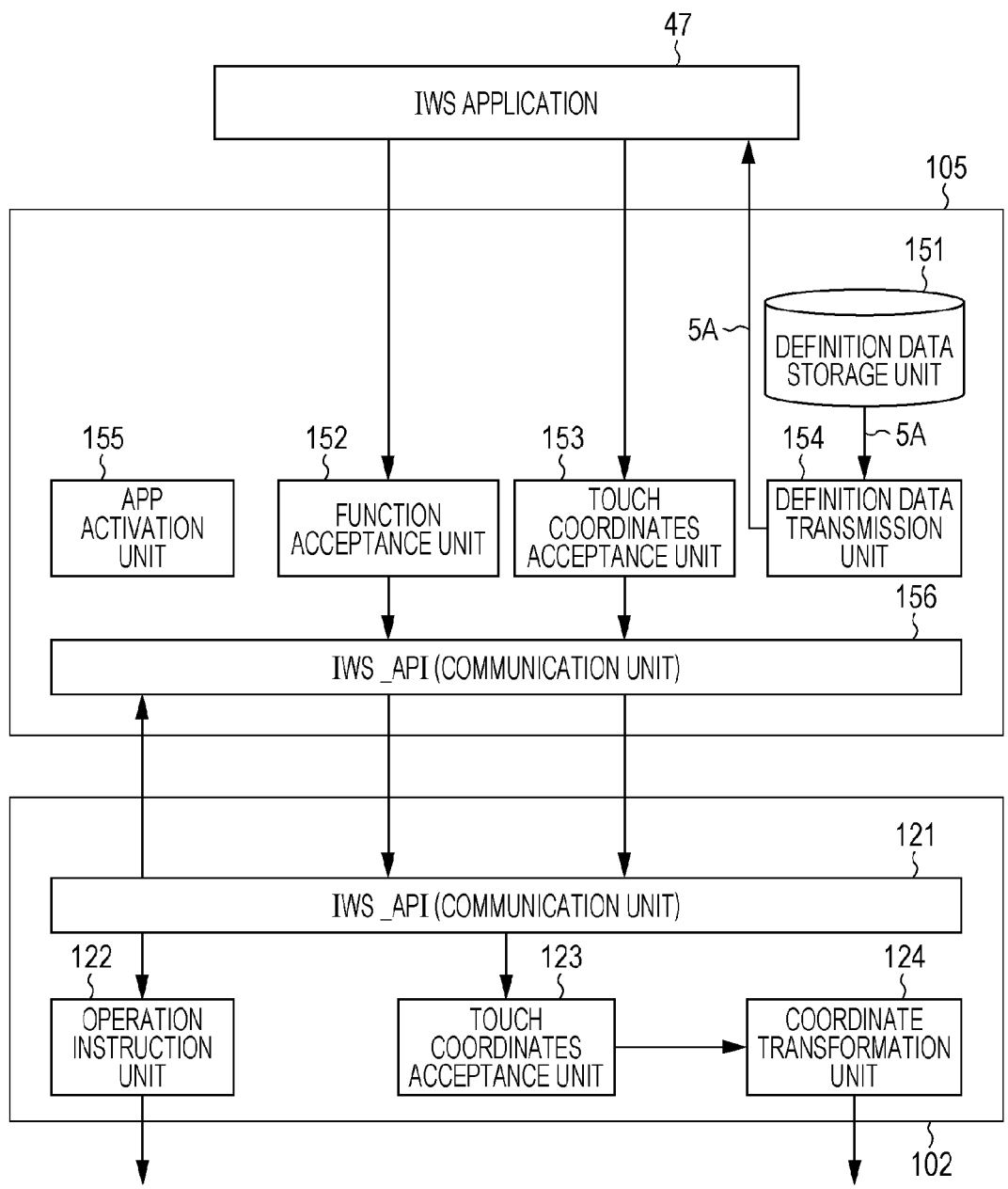
FIG. 6 is a diagram illustrating an example of a functional configuration of each of an MFP control platform and an IWS application platform.

FIG. 6 is a diagram illustrating an example of a functional configuration of each of the MFP control platform 102 and the IWS application platform 105. FIG. 7 is a diagram illustrating an example of definition data 5A. FIG. 8 is a diagram illustrating an example of a coordinate transformation table 5C.

First, a platform will be described in which the IWS application 47 operates. Here, in particular, processing related to the screen of the IWS application 47 will be described.

The MFP control platform 102 includes a communication unit 121, an operation instruction unit 122, a touch coordinates acceptance unit 123, and a coordinate transformation unit 124, as illustrated in FIG. 6.

The IWS application platform 105 includes a definition data storage unit 151, a function acceptance unit 152, a touch coordinates acceptance unit 153, a definition data transmission unit 154, an application activation unit 155, and a communication unit 156.

The communication unit 121 of the MFP control platform 102 is a common application program interface (API), and provides functions of the operating system 101 to the IWS application platform 105.

Specifically, for each of a versatile function of the operating system 101, an API function defining a procedure for implementing the function is prepared (defined) in the communication unit 121. Then, the communication unit 121 accepts designation of an identifier (hereinafter, described as a "function name") of the API function from the IWS application platform 105.

Then, the operation instruction unit 122 gives an instruction to each unit (the operating system 101, each hardware component, or the like) so that the procedure defined by the API function is executed.

Then, the communication unit 121 returns the result of execution of the procedure to the IWS application platform 105, as appropriate.

However, the API function is not defined for some of the functions of the operating system 101.

In the IWS application platform 105, the definition data 5A is stored for each API function described above prepared in the MFP control platform. 102, in the definition data storage unit 151, as illustrated in FIG. 7.

The following information is indicated in the definition data 5A. The "function name" is a function name of an API function corresponding to the definition data 5A. An "object identifier" is an identifier (ID) of an object for calling the API function. In general, the object may also be referred to as a "control." Hereinafter, the object for calling the API function is described as a "function call object." In the present embodiment, a button representing a key is used as the function call object.

The function call object is arranged on the screen of the IWS application 47, and is used by the user for calling the API function. Work of arrangement is performed by the developer of the IWS application 47. At this time, the application generation program. 20P is used. Generation of the IWS application 47 will be described later.

In the screen of the IWS application 47, when the function call object is selected by being touched, for example, the processing is performed by each unit as follows.

The IWS application platform 105 is notified of the function name of the API function corresponding to the selected function call object, from the IWS application 47.

In the IWS application platform 105, the function acceptance unit 152 accepts the function name of which notice is given from the IWS application 47.

The communication unit 156 is an API of the IWS, and exchanges information with the MFP control platform 102.

The function acceptance unit 152 accepts the function name of which notice is given from the IWS application 47.

Then, the communication unit 156 calls the API function of the function name by designating the function name in the MFP control platform 102.

Then, in the MFP control platform 102, when the function name is designated in the communication unit 121, the operation instruction unit 122 gives the instruction to each unit so that the procedure is executed defined in the API function of the function name, as described above. The communication unit 121 returns the result of execution of the procedure to the IWS application platform 105, as appropriate.

The developer of the IWS application 47 is able to arrange a native compatible object on the screen of the IWS application 47, as an object other than the function call object.

The native compatible object is an object that performs an equivalent function as that of the object arranged on the screen of the native application 40. Hereinafter, a case will be described as an example in which a button representing a key is used as the native compatible object. How to arrange the native compatible object will be described later.

When the native compatible object is touched, processing is performed by each unit as follows.

The IWS application platform 105 is notified of the coordinates of the touched position, from the IWS application 47.

In the IWS application platform 105, the touch coordinates acceptance unit 153 accepts the coordinates of which notice is given from the IWS application 47. Then, the communication unit 156 notifies the MFP control platform 102 of the coordinates.

In the MFP control platform 102, the touch coordinates acceptance unit 123 accepts the coordinates of which notice is given from the IWS application platform 105.

Then, the coordinate transformation unit 124 transforms the coordinates to coordinates of the center of the object in the screen of the native application 40, corresponding to the coordinates of which notice is given. At this time, the coordinate transformation table 5C of the IWS application 47 illustrated in FIG. 8 is used as follows.

The coordinate transformation unit 124 calculates a rectangular area having a line segment as a diagonal line connecting start coordinates and end coordinates together, for each record stored in the coordinate transformation table 5C. An area is searched to which the coordinates of which notice is given belongs, from the calculated area. Then, the coordinates of which notice is given is transformed to the central coordinates to be indicated in a record relating to the area found.

Incidentally, the coordinate transformation table 5C is installed together with the IWS application 47 when the IWS application 47 is generated, as described later.

The operation instruction unit 122 gives an instruction to each unit (the operating system 101, each hardware unit, or the like) so that each unit operates similarly to a case in which a position is touched of the coordinates (central coordinates) obtained by the coordinate transformation unit 124, of a screen of a screen number indicated in the record. That is, the operation instruction unit 122 assumes that an object in the screen corresponding to the coordinates is touched, and gives the instruction to each unit so that processing corresponding to the object is executed.

[Generation of IWS Application 47]

Figure 9:
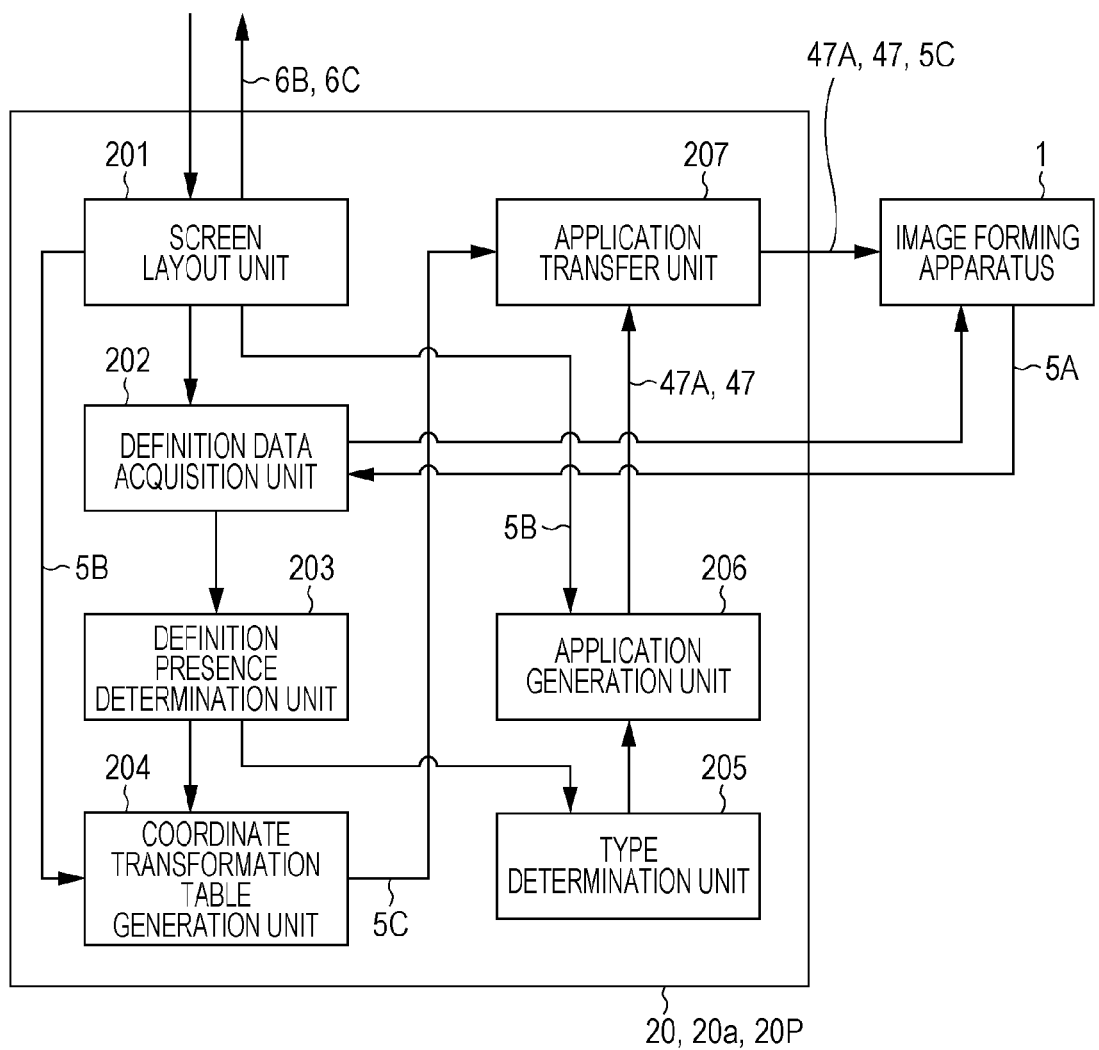
FIG. 9 is a diagram illustrating an example of a functional configuration of the terminal device.
Figure 10:
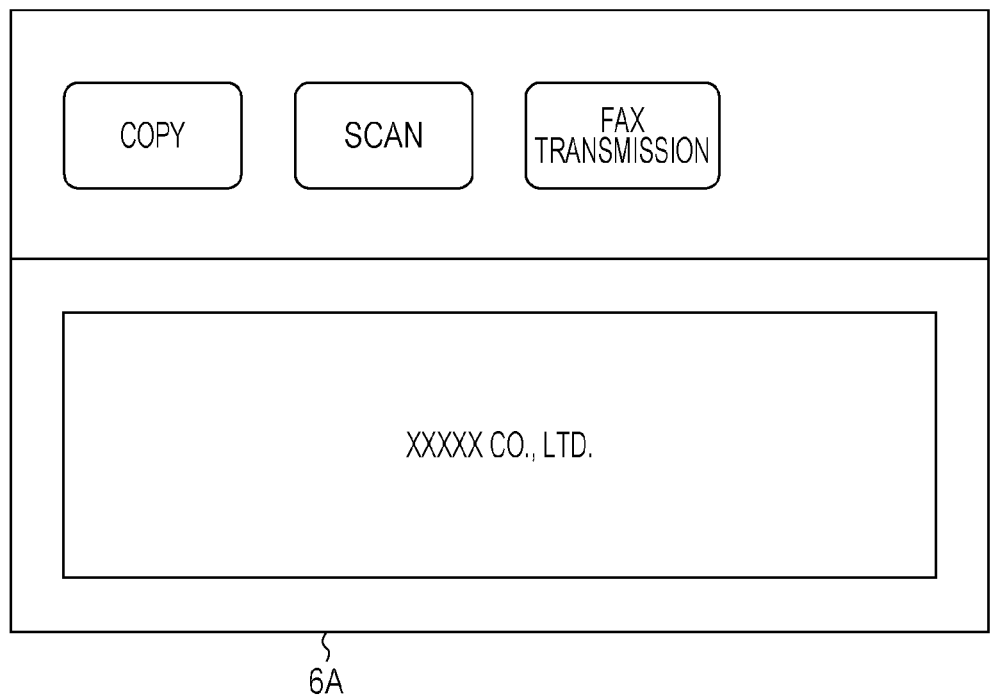
FIG. 10 is a diagram illustrating an example of a one-touch screen.
Figure 11:
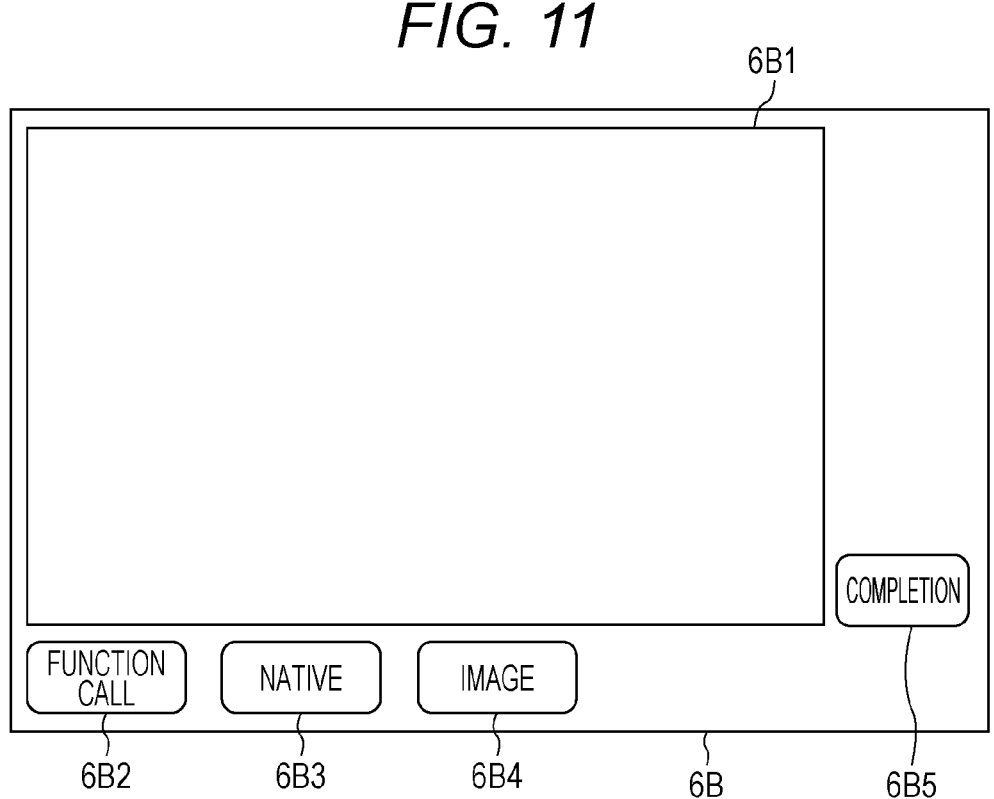
FIG. 11 is a diagram illustrating an example of a layout screen.
Figure 12A:
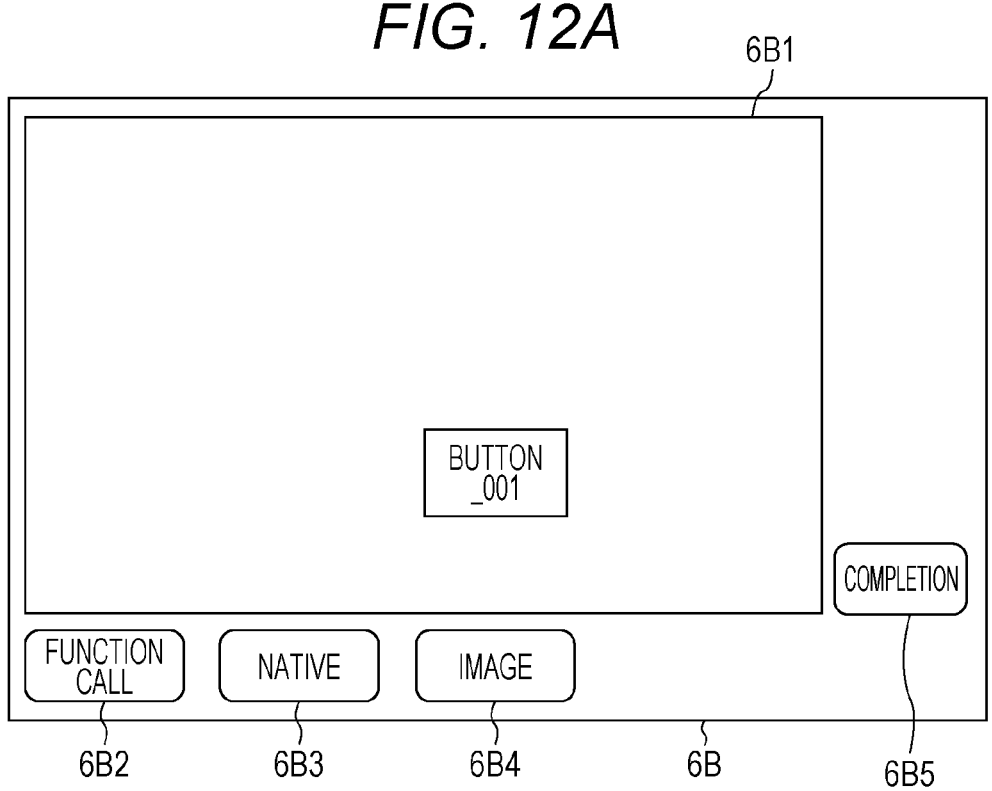
FIGS. 12A and 12B are diagrams each illustrating an example of a method for arranging a function call object.
Figure 12B:
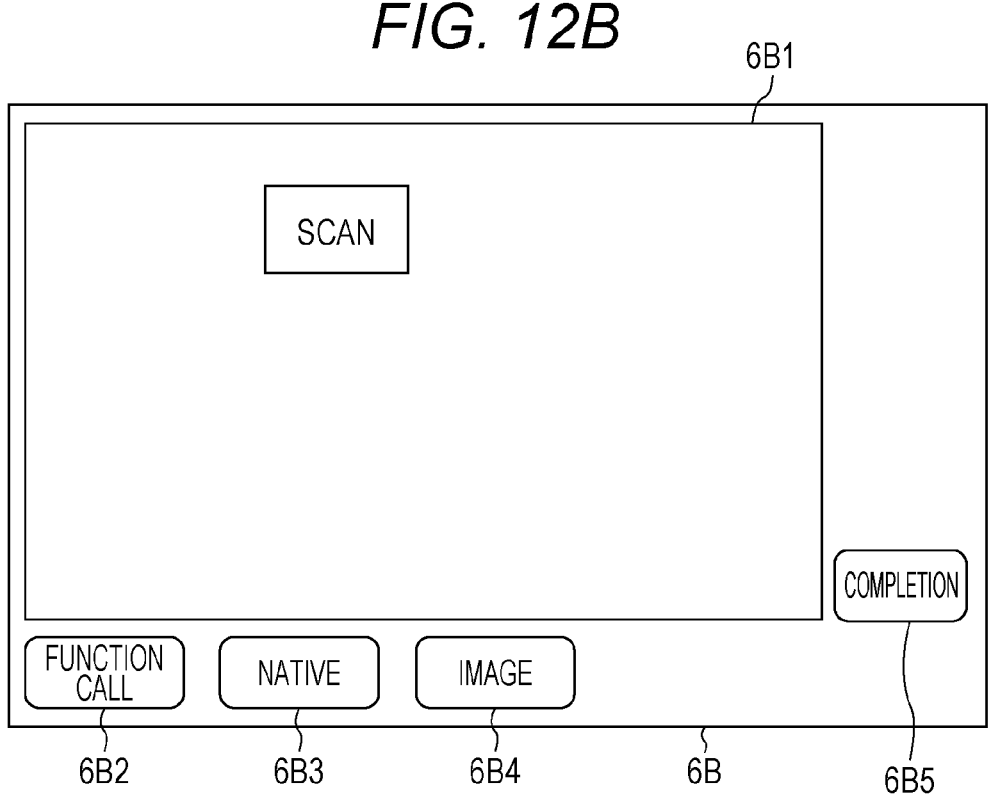
Figure 13A:
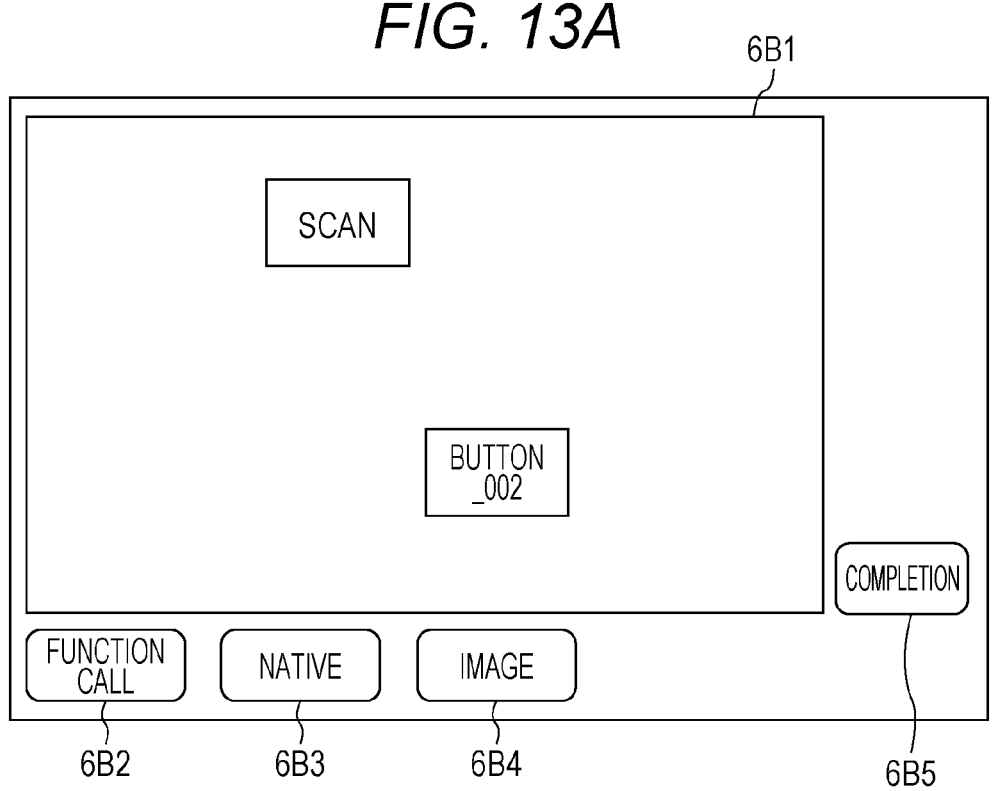
FIGS. 13A and 13B are diagrams each illustrating an example of a method for arranging a native compatible object.
Figure 13B:
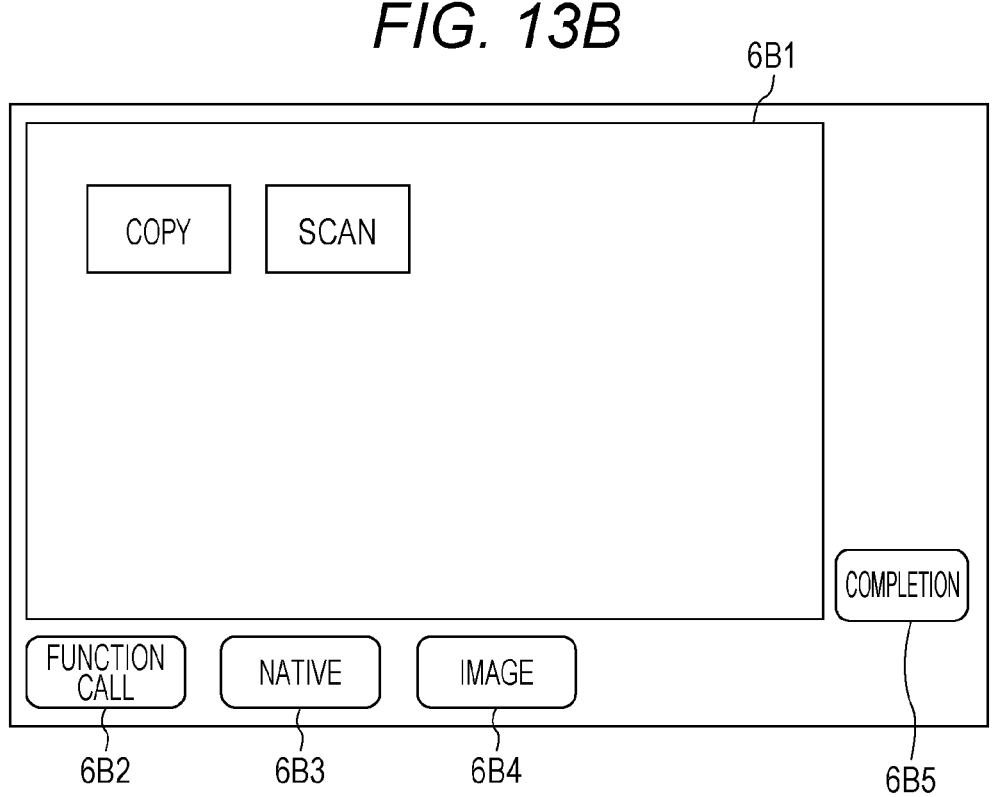
Figure 16A:
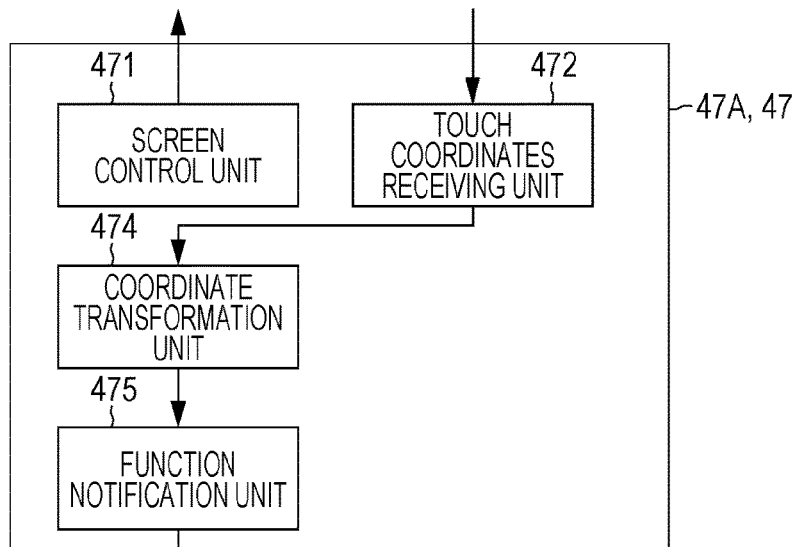
FIGS. 16A to 16C are diagrams illustrating examples of three types of IWS applications, respectively.
Figure 16B:
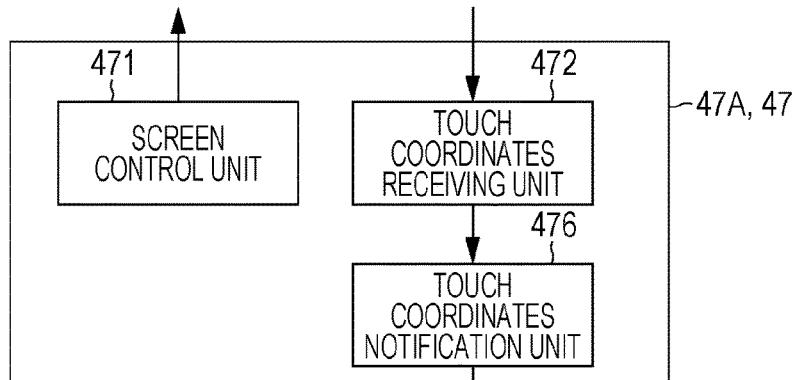
Figure 16C:
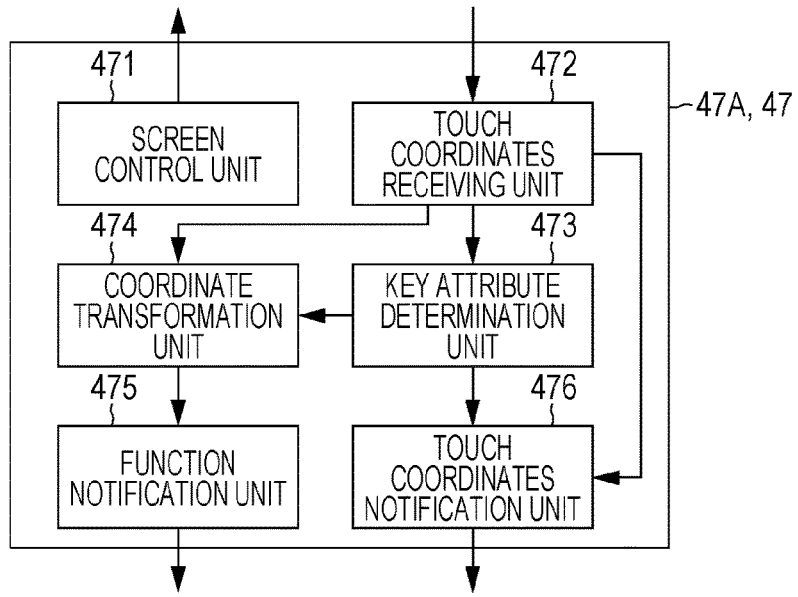

FIG. 9 is a diagram illustrating an example of a functional configuration of the terminal device 20. FIG. 10 is a diagram illustrating an example of a one-touch screen 6A. FIG. 11 is a diagram illustrating an example of a layout screen 6B. FIGS. 12A and 12B are diagrams each illustrating an example of a method for arranging a function call object. FIGS. 13A and 13B are diagrams each illustrating an example of a method for arranging a native compatible object. FIG. 14 is a diagram illustrating an example of a copy command screen 6C. FIG. 15 is a diagram illustrating an example of attribute data 5B. FIGS. 16A to 16C are diagrams illustrating examples of three types of IWS applications 47, respectively.

The developer is able to generate the IWS application 47 with the application generation program 20P.

The application generation program 20P is executed, whereby a screen layout unit 201, a definition data acquisition unit 202, a definition presence determination unit 203, a coordinate transformation table generation unit 204, a type determination unit 205, an application generation unit 206, an application transfer unit 207, and the like illustrated in FIG. 9 are implemented in the terminal device 20. Each unit from the screen layout unit 201 to the application transfer unit 207 is an extension of the integrated UI builder.

Hereinafter, processing of each unit of FIG. 9 will be described by taking a case as an example in which a one-touch application 47A is generated that allows the user to command with one-touch selectively any one of jobs of the copy, scan, and fax transmission, from the one-touch screen 6A of FIG. 10, as the IWS application 47.

The screen layout unit 201 executes processing for laying out the one-touch screen 6A as follows.

When the developer inputs a predetermined command, the screen layout unit 201 displays the layout screen 6B as illustrated in FIG. 11 on the liquid crystal display 20e.

Here, the developer arranges the function call object, native compatible object, logo, wallpaper, and the like arbitrarily to a layout area 6B1 in the layout screen 6B, thereby laying out the one-touch screen 6A.

The developer clicks a function call button 6B2 when arranging the function call object.

Then, the screen layout unit 201 displays a first dialog box in which a list of the function call objects is arranged, on the layout screen 6B. The object identifier of the function call object, description of processing implemented by selecting the function call object, and the like are displayed in the list.

Here, the developer selects a function call object to be arranged from the first dialog box.

Then, the screen layout unit 201 closes the first dialog box, and arranges the selected function call object in the layout area 6B1 as illustrated in FIG. 12A.

Then, the developer adjusts the position of the arranged function call object by dragging, for example, and gives a name to the function call object, as illustrate in FIG. 12B, as appropriate.

Then, the screen layout unit 201 issues an identifier (key number) of the function call object in the one-touch screen 6A. Then, the function call object is associated with the key number issued, the upper left coordinates of the adjusted position (hereinafter, described as "start coordinates") and lower right coordinates (hereinafter, described as "end coordinates"), the object identifier of the function call object, and the name given.

The developer clicks a native button 6B3 when arranging the native compatible object.

Then, the screen layout unit 201 displays a second dialog box in which a list of the screens for each native application 40 is arranged, on the layout screen 6B.

The developer selects a native application 40 in which an object is arranged having a function to be given to the native compatible object, from the list.

Then, the screen layout unit 201 displays the screen of the native application 40 selected, on the liquid crystal display 20e. For example, when a copy application is selected, the copy command screen 6C is displayed as illustrated in FIG. 14.

The developer selects an object having a function to be given to the native compatible object, from the copy command screen 6C.

Then, the screen layout unit 201 closes the second dialog box, and arranges the native compatible object in the layout area 6B1 as illustrated in FIG. 13A.

The developer adjusts the position of the arranged native compatible object by dragging, for example, and gives a name of the native compatible object, as illustrated in FIG. 13B, as appropriate.

Then, the screen layout unit 201 issues a key number of the native compatible object. Then, the native compatible object is associated with the key number issued, the identifier of the screen of the native application 40 selected (screen number), the coordinates of the center of the object selected (hereinafter, described as "central coordinates"), the start coordinates and end coordinates of the adjusted position of the native compatible object, and the name given.

In addition, the developer clicks an image button 6B4 when arranging the image such as the logo or wallpaper.

Then, the screen layout unit 201 displays a third dialog box for designating an image file to be arranged, on the layout screen 6B. The developer designates the file in the third dialog box.

The screen layout unit 201 closes the third dialog box, and arranges the image in the layout area 6B1 on the basis of the file designated. Then, the developer adjusts the position of the image, as appropriate.

The developer performs the operation described above as appropriate, and the screen layout unit 201 performs the processing described above according to the operation, whereby the function call object, the native compatible object, and the image are arranged to the layout area 6B1. When the arrangement is completed, the developer clicks a completion button 6B5.

The arrangement of the object in the layout area 6B1 is performed in this way, whereby the layout of the one-touch screen 6A is completed. In addition, with the processing by the screen layout unit 201, the attribute data 5B is obtained for each of the function call object and native compatible object arranged in the layout area 6B1, as illustrated in FIG. 15.

Incidentally, the screen layout unit 201 is capable of displaying any one of all screens prepared in advance in the image forming apparatus 1 as appropriate on the liquid crystal display 20e, besides the copy command screen 6C, in order to allows the developer to select an object having a function to be given to (associated with) the native compatible object.

The definition data acquisition unit 202 and the definition presence determination unit 203, for each time when an object for designating processing and the like (in the present embodiment, a button representing a key) is arranged on the one-touch screen 6A, perform processing for determining whether or not there is an API function corresponding to the object as follows.

When an object identifier is indicated in the attribute data 5B of the object, the definition data acquisition unit 202 requests definition data by notifying the image forming apparatus 1 of the object identifier.

In the image forming apparatus 1, the definition data transmission unit 154 of the IWS application platform 105 searches the definition data 5A indicating the object identifier of which notice is given from the terminal device 20, from the definition data storage unit 151. When the definition data 5A is found, the definition data 5A is transmitted to the terminal device 20.

Then, the definition data acquisition unit 202 accepts the definition data 5A from the image forming apparatus 1. In this way, the definition data 5A is acquired of the object arranged on the one-touch screen 6A.

When the definition data 5A is acquired by the definition data acquisition unit 202, the definition presence determination unit 203 determines that there is an API function for the object arranged on the one-touch screen 6A. When the definition data is not acquired, it is determined that there is no API function.

With the processing described above, as a result, it is determined that the API function is defined when the object arranged on the one-touch screen 6A is a function call object, and it is determined that the API function is not defined when the object is a native compatible object.

The coordinate transformation table generation unit 204 generates the coordinate transformation table 5C as illustrated in FIG. 8 as follows.

The coordinate transformation table generation unit 204 acquires the attribute data 5B (see FIG. 15) of each object determined by the definition presence determination unit 203 that the API function is not defined (that is, native compatible object), from the screen layout unit 201.

Then, the coordinate transformation table generation unit 204 extracts and collects the start coordinates, end coordinates, screen number, and central coordinates, from each attribute data 5B acquired. Thus, the coordinate transformation table 5C is generated.

The coordinate transformation table 5C is used by the image forming apparatus 1 for transforming object coordinates in the one-touch screen 6A to the coordinates in the screen of the native application 40 corresponding to the object coordinates, as described above.

The type determination unit 205 determines a type of the one-touch application 47A as follows.

When the API function is defined for every object for designating processing and the like arranged on the one-touch screen 6A (in the present embodiment, a button representing a key), the type determination unit 205 determines that the one-touch application 47A is of a first type. When no API function is defined, it is determined that the one-touch application 47A is of a second type. When one for which the API function is defined and one for which the API function is not defined are mixed, it is determined that the one-touch application 47A is of a third type.

The application generation unit 206 generates the one-touch application 47A depending on the type determined by the type determination unit 205 as follows.

When it is determined that the type is the first type, the application generation unit 206 generates an application configured by a screen control unit 471, a touch coordinates receiving unit 472, a coordinate transformation unit 474, a function notification unit 475, and the like, as illustrated in FIG. 16A, as the one-touch application 47A.

When it is determined that the type is the second type, the application generation unit 206 generates an application configured by the screen control unit 471, the touch coordinates receiving unit 472, a touch coordinates notification unit 476, and the like, as illustrated in FIG. 16B, as the one-touch application 47A.

When it is determined that the type is the third type, the application generation unit 206 generates an application configured by the screen control unit 471, the touch coordinates receiving unit 472, a key attribute determination unit 473, the coordinate transformation unit 474, the function notification unit 475, the touch coordinates notification unit 476, and the like, as illustrated in FIG. 16C, as the one-touch application 47A.

The application generation unit 206 generates the one-touch application 47A by rewriting a template prepared in advance for each of the three types. The processing of each unit from the screen control unit 471 to the touch coordinates notification unit 476 is as follows.

The screen control unit 471 performs processing for causing the web browser 40A to display the one-touch screen 6A. Specifically, a file is generated or prepared for displaying the one-touch screen 6A, and is provided to the web browser 40A. The file is described with Hypertext Markup Language (HTML), JavaScript, or the like. In addition, when the image such as the logo or wallpaper is arranged on the one-touch screen 6A, the image file of the image is also provided to the web browser 40A.

The application generation unit 206 rewrites a code defining the layout of the screen of codes described in the template so that the attribute data 5B (see FIG. 15) obtained by the screen layout unit 201 is used as layout data of the one-touch screen 6A. Rewriting is performed in any cases of the first type, second type, and third type.

The touch coordinates receiving unit 472 accepts coordinates (hereinafter, described as "touch coordinates") indicating a position touched by the user on the touch panel display 10e1.

When the touch coordinates is accepted by the touch coordinates receiving unit 472, the key attribute determination unit 473 determines an attribute of an object (hereinafter, described as a "touch object") arranged at the touch coordinates of the one-touch screen 6A as follows.

The key attribute determination unit 473 calculates for each attribute data 5B a rectangular area having a line segment as a diagonal line connecting the start coordinates and end coordinates together indicated in the attribute data 5B together. An area to which the touch coordinates belong is searched from the area calculated.

When the screen number and the central coordinates are indicated in the attribute data 5B relating to the area found, the key attribute determination unit 473 determines that the touch object is a native compatible object. On the other hand, when the screen number and the central coordinates are not indicated, it is determined that the touch object is a function call object.

The application generation unit 206 rewrites a code relating to determination of the codes described in the template so that the attribute data 5B is used as data for the determination described above. Rewriting is performed only in a case of the third type.

The coordinate transformation unit 474 converts the touch coordinates to the function name of the API function indicated in the definition data 5A acquired by the definition data acquisition unit 202. However, as for the third type, conversion is performed only when the key attribute determination unit 473 determines that the touch object is a function call object.

The application generation unit 206 rewrites a code relating to conversion of the codes described in the template so that the attribute data 5B is used as data for the conversion described above. Rewriting is performed in a case of the first type and in a case of the third type.

The function notification unit 475 notifies the IWS application platform 105 of the function name obtained by the processing of the coordinate transformation unit 474.

The touch coordinates notification unit 476 notifies the IWS application platform 105 of the touch coordinates. However, as for the third type, the notification is performed only when the key attribute determination unit 473 determines that the touch object is a native compatible object.

Returning to FIG. 9, when the coordinate transformation table 5C is generated by the coordinate transformation table generation unit 204, and the one-touch application 47A is generated by the application generation unit 206, the application transfer unit 207 transfers the coordinate transformation table 5C and the one-touch application 47A to the image forming apparatus 1.

Incidentally, the coordinate transformation table 5C is transferred as a file of a format such as Extensible Markup Language (XML) or Comma Separated Value (CSV), for example. In addition, the one-touch application 47A is transferred as a text file describing a source code. Alternatively, the one-touch application 47A is transferred as an object code file obtained by compiling the source code.

In the image forming apparatus 1, the one-touch application 47A and the coordinate transformation table 5C are associated with each other, and installed in a predetermined storage area of the auxiliary storage device 10d.

[Execution of Each Type of IWS Application 47]

Figure 17C:
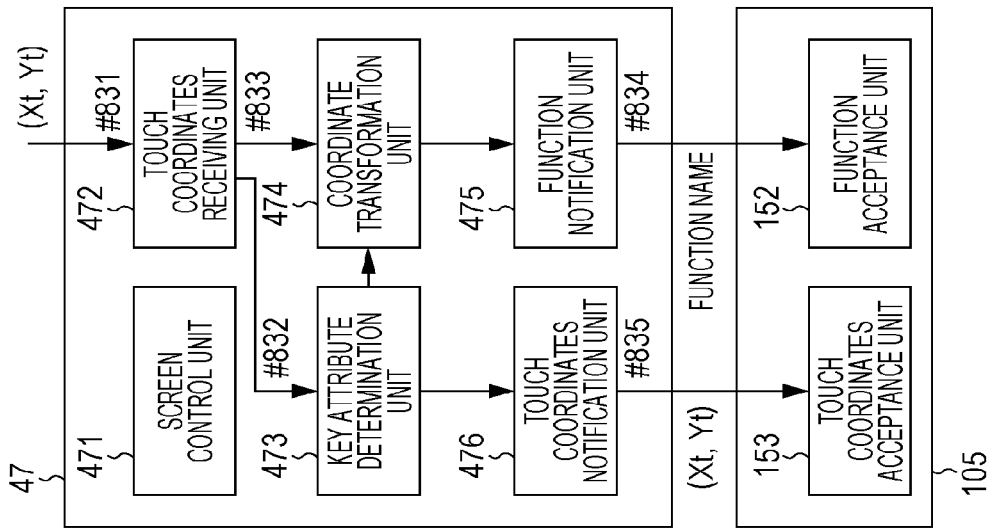
FIGS. 17A to 17C are diagrams illustrating examples of processing flows of the three types of IWS applications, respectively.
Figure 17B:
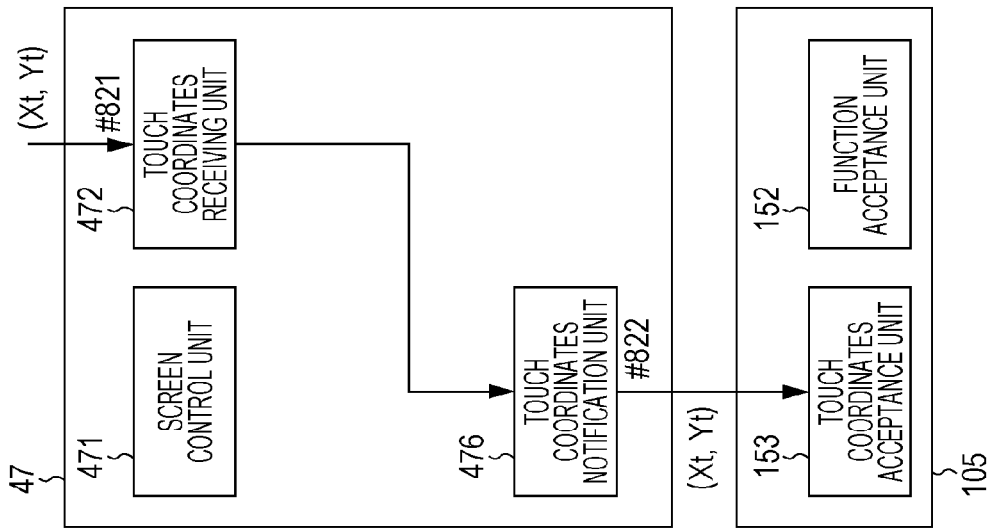
Figure 17A:
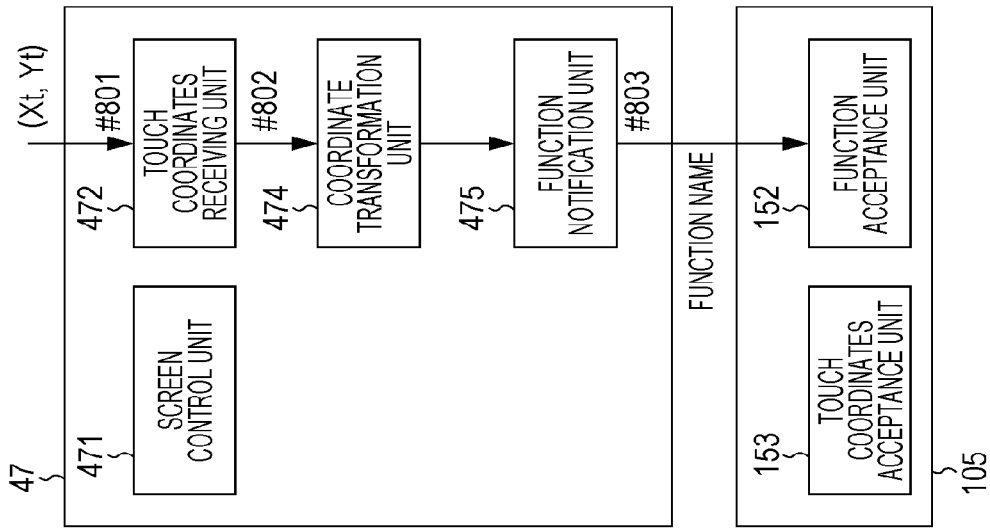

FIGS. 17A to 17C are diagrams illustrating examples of processing flows of the three types of IWS applications 47, respectively.

Next, acceptance processing of user operation by the IWS application 47 of each of the first type, second type, and third type will be described with reference to FIGS. 17A to 17C.

In a case in which the IWS application 47 is of the first type, when the touch coordinates receiving unit 472 accepts the touch coordinates (for example, (Xt, Yt)) (#801), the coordinate transformation unit 474 converts the touch coordinates to the function name of the API function (#802), as illustrated in FIG. 17A. Then, the function notification unit 475 notifies the IWS application platform 105 of the function name (#803).

In a case in which the IWS application 47 is of the second type, when the touch coordinates receiving unit 472 accepts the touch coordinates (#821), the touch coordinates notification unit 476 notifies the IWS application platform 105 of the touch coordinates (#822), as illustrated in FIG. 17B.

In a case in which the IWS application 47 is of the third type, when the touch coordinates receiving unit 472 accepts the touch coordinates (#831), the key attribute determination unit 473 determines the attribute of the object arranged at the touch coordinates, that is, the touch object (#832), as illustrated in FIG. 17C.

When it is determined that the touch object is a function call object, the coordinate transformation unit 474 converts the touch coordinates to the function name of the API function (#833). Then, the function notification unit 475 notifies the IWS application platform 105 of the function name (#834).

On the other hand, when it is determined that the touch object is a native compatible object, the touch coordinates notification unit 476 notifies the IWS application platform 105 of the touch coordinates (#835).

Figure 18:
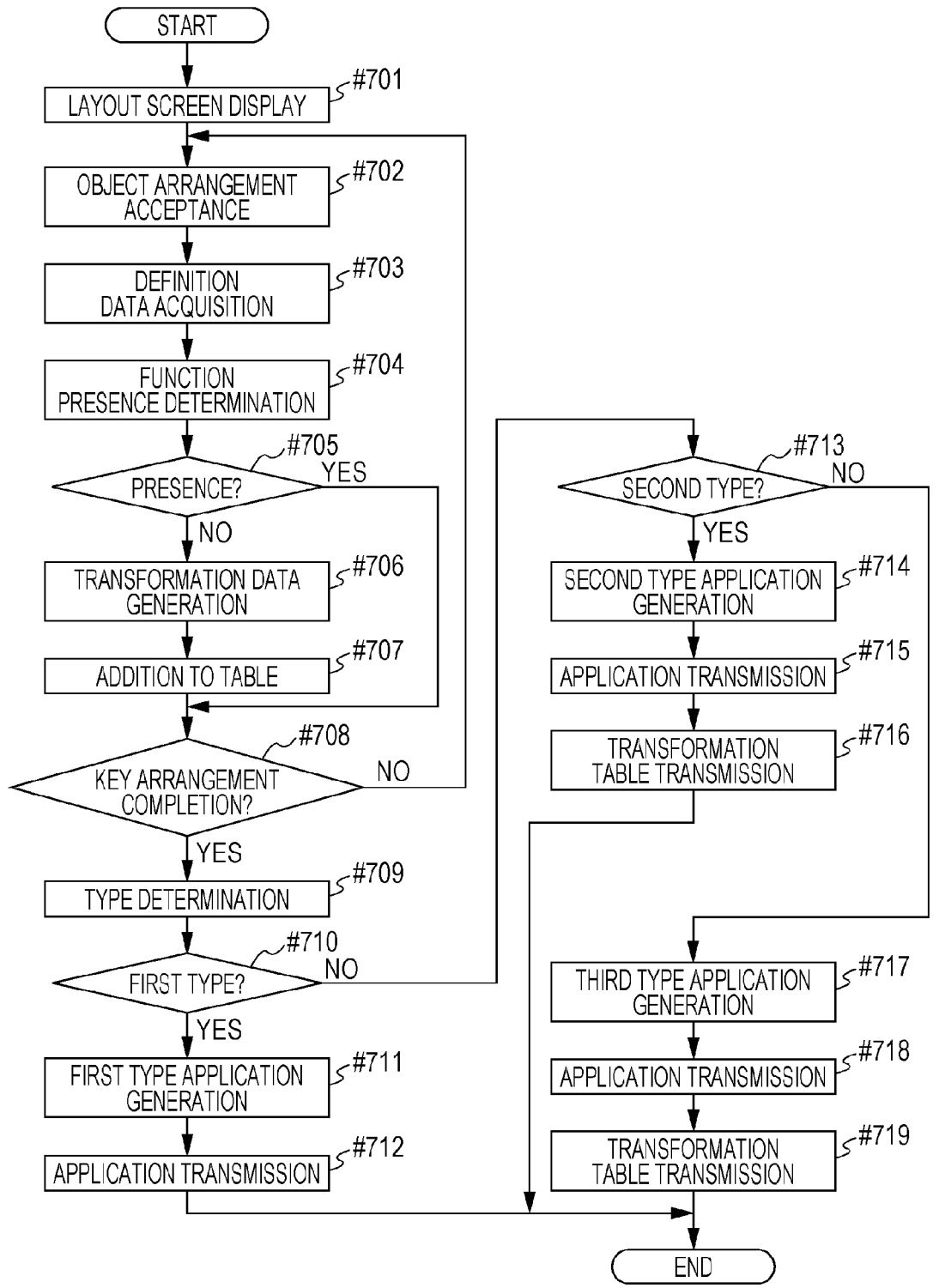
FIG. 18 is a flowchart for explaining an overall processing flow of generation of the IWS application.

FIG. 18 is a flowchart for explaining an overall processing flow of generation of the IWS application 47.

Next, the overall processing flow of when the terminal device 20 generates the IWS application 47 will be described with reference to the flowchart of FIG. 18.

The terminal device 20 executes the processing in a procedure illustrated in FIG. 18, on the basis of the application generation program 20P.

When a predetermined command is input, the terminal device 20 displays the layout screen 6B (see FIG. 11) (#701).

When the developer operates the layout area 6B1, the function call button 6B2, the native button 6B3, the image button 6B4, the first dialog box, the second dialog box, or the third dialog box, the terminal device 20 accepts designation of arrangement of the object to the screen of the IWS application 47 generated (#702).

When an object of a predetermined type such as a button representing a key is arranged, the terminal device 20 tries to acquire the definition data 5A corresponding to the object (#703). When the definition data 5A is acquired, it is determined that there is an API function corresponding to the object, and when the definition data 5A is not acquired, it is determined that there is no API function (#704).

When it is determined that there is no API function for the object (No in #705), the terminal device 20 generates data (record) indicating the start coordinates and end coordinates of the object and the central coordinates of the object in the screen of the native application 40 designated in step #702 (#706), and adds the data to the coordinate transformation table 5C (see FIG. 8) (#707).

The terminal device 20 executes the processing of steps #702-#707 as appropriate, until the completion button 6B5 is clicked. Incidentally, the processing of steps #703-#707 may be collectively executed after the completion button 6B5 is clicked.

When the completion button 6B5 is clicked (Yes in #708), the terminal device 20 determines the type of the IWS application 47 (#709).

When the IWS application 47 is of the first type (Yes in #710), the terminal device 20 generates the IWS application 47 by rewriting the first type template depending on the processing result in steps #702-#704 (#711), and transmits the IWS application 47 to the image forming apparatus 1 (#712).

When the IWS application 47 is of the second type (No in #710, Yes in #713), the terminal device 20 generates the IWS application 47 by rewriting the second type template depending on the processing result in steps #702-#704 (#714). Then, the IWS application 47 and the coordinate transformation table 5C generated in steps #706-#707 are transmitted to the image forming apparatus 1 (#715, #716).

When the IWS application 47 is of the third type (No in #713), the terminal device 20 generates the IWS application 47 by rewriting the third type template depending on the processing result in steps #702-#704 (#717). Then, the IWS application 47 and the coordinate transformation table 5C generated in steps #706-#707 are transmitted to the image forming apparatus 1 (#718, #719).

With the present embodiment, the developer is able to lay out the one-touch screen 6A, for example, without worrying about the type of the object. Thus, with the present embodiment, the developer is able to lay out the custom screen for using a necessary function more easily than before.

Figures 19, 20:
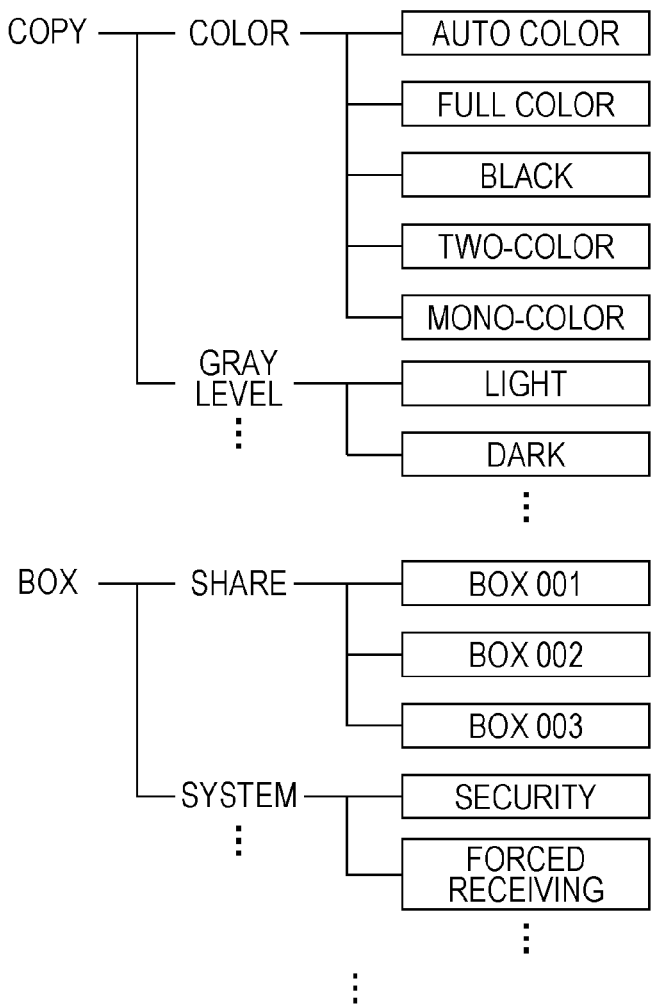
FIG. 19 is a diagram illustrating an example of a modification of the coordinate transformation table.
FIG. 20 is a diagram illustrating a modification of a list of the objects.

FIG. 19 is a diagram illustrating an example of a modification of the coordinate transformation table 5C. FIG. 20 is a diagram illustrating a modification of the list of the objects.

There maybe a case in which the developer arranges a plurality of the same function call objects to the layout area 6B1 of the layout screen 6B (see FIG. 11). In particular, when layout work is interrupted once and then restarted, it is likely to happen that such arrangement is made.

Therefore, when the developer selects the function call object already arranged to the layout area 6B1 from the first dialog box (the dialog box in which the list of the function call objects is arranged), the screen layout unit 201 may display a message for warning that the function call is already arranged.

Then, the screen layout unit 201 can arrange the function call object to the layout area 6B1 when the developer commands duplicate arrangement, and stop the arrangement when the developer commands cancellation.

In addition, there may be a case in which the developer arranges a plurality of native compatible objects having an equivalent function, to the layout area 6B1.

Therefore, when the developer designates the object already arranged from the copy command screen 6C (see FIG. 14), the screen layout unit 201 may display a message warning that the native compatible object corresponding to the object is already arranged.

Then, the screen layout unit 201 can arrange the native compatible object to the layout area 6B1 when the developer commands duplicate arrangement, and stop the arrangement when the developer commands cancellation.

In the present embodiment, only one object arranged on the copy command screen 6C is associated with the native compatible object; however, it may be configured so that the plural objects can be associated with the native compatible object. In this case, each unit of the terminal device 20 can perform processing as follows.

The developer designates the plural objects from the copy command screen 6C by clicking. Not only the objects of the copy command screen 6C, but also the object of another screen may be designated further.

Then, the screen layout unit 201 accepts the plural objects in the order designated.

Then, the coordinate transformation table generation unit 204 generates the coordinate transformation table 5C having a record indicating the screen number and the central coordinates in the order designated, as illustrated in FIG. 19.

In addition, when a plurality of combinations of the screen number and the central coordinates is indicated in a record corresponding to the coordinates accepted by the touch coordinates acceptance unit 123, the operation instruction unit 122 of the MFP control platform 102 (see FIG. 6) gives an instruction to each unit so that the processing is executed assuming that the central coordinates in the screen of the screen number are touched in the order indicated in the record.

In the present embodiment, a rectangular button is used as a button representing a key; however, another shape may be used. For example, a perfect circle or an ellipse may be used. When the button is rectangular, the area of the button is specified by the start coordinates (coordinates of the upper left vertex) and the end coordinates (coordinates of the lower right vertex); however, in a case of the perfect circle, the area can be specified by the coordinates of the center and the radius. In a case of the ellipse, the area can be specified by the coordinates of the center, the coordinates of the focal point, the length of the major axis, and the length of the minor axis.

The list of the function call objects arranged in the first dialog box may be changed depending on the model of the image forming apparatus to which the generated IWS application 47 is applied. Similarly, as the screen on which an object having a function to be given to the native compatible object is arranged (for example, the copy command screen 6C of FIG. 14), the screen of the model of the image forming apparatus to which the generated IWS application 47 is applied may be displayed.

Then, the application transfer unit 207 can deliver the IWS application 47 generated and the coordinate transformation table 5C to all models of the image forming apparatus that are compatible to the IWS application 47 and provided in the image processing system 3. The IWS application 47 generated and the coordinate transformation table 5C can be prevented from being delivered to a model of the image forming apparatus not compatible.

In the present embodiment, the terminal device 20 displays the screen in order to allow the developer to designate the object 30 of the screen of the native application 40 (for example, the copy command screen 6C); however, the objects configuring the screen may be displayed in a hierarchical structure, as illustrated in FIG. 20.

Besides, in the image processing system 3, the image forming apparatus 1, and the terminal device 20, the configuration of whole or each unit, the contents of the processing, the order of the processing, the configuration of data, and the like, can be changed as appropriate in accordance with the spirit of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An application generator that generates a screen display application for causing an image forming apparatus to execute display processing for displaying a command screen on which one or more objects are arranged for giving commands, the application generator comprising:
    an acceptance section that accepts arrangement of any one of a plurality of first objects each being prepared in advance for commanding to execute particular processing, to the command screen, or accepts arrangement of a second object different from the first object, and a third object arranged on an other screen and to be associated with the second object, to the command screen;
    a generation section that generates an application for displaying an acceptance screen on which one or both of the first object and the second object are arranged based on a result of acceptance by the acceptance section, for commanding to execute the particular processing relating to the first object when the first object is selected, and for giving notice of coordinates of the second object when the second object is selected, as the screen display application; and
    an output section that outputs the screen display application generated by the generation section and correspondence data indicating a correspondence between a position of the second object in the acceptance screen and the third object, and
    wherein the other screen is a screen that is used in a second application fixedly installed in advance in the image forming apparatus.

2. The application generator according to claim 1, wherein
    the acceptance section displays the other screen, and accepts one selected from objects arranged on the other screen, as the third object.

3. The application generator according to claim 1, wherein
    the acceptance section displays a list of the objects arranged on the other screen in a form of a hierarchical structure, and accepts one selected from the list, as the third object.

4. The application generator according to claim 1, further comprising:
    an acquisition section that acquires processing name data indicating a processing name of the particular processing; and
    a determination section that determines whether the object accepted by the acceptance section and arranged on the screen is the first object or not, based on the processing name data, wherein
    the generation section generates the screen display application, based on a result of the determination section.

5. An application generator that generates a screen display application for causing an image forming apparatus to execute display processing for displaying a command screen on which one or more objects are arranged for giving commands, the application generator comprising:
    an acceptance section that accepts arrangement of any one of a plurality of first objects each being prepared in advance for commanding to execute particular processing, to the command screen, or accepts arrangement of a second object different from the first object, and a third object arranged on an other screen and to be associated with the second object, to the command screen;
    a generation section that generates an application for displaying an acceptance screen on which one or both of the first object and the second object are arranged based on a result of acceptance by the acceptance section, for commanding to execute the particular processing relating to the first object when the first object is selected, and for giving notice of coordinates of the second object when the second object is selected, as the screen display application; and
    an output section that outputs the screen display application generated by the generation section and correspondence data indicating a correspondence between a position of the second object in the acceptance screen and the third object, and
    wherein the acceptance section displays to the command screen a message notifying that a duplicate object is about to be arranged when arrangement of the same first object is accepted a plurality of times or when the same third object is accepted a plurality of times.

6. An application generator that generates a screen display application for causing an image forming apparatus to execute display processing for displaying a command screen on which one or more objects are arranged for giving commands, the application generator comprising:
    an acceptance section that accepts arrangement of any one of a plurality of first objects each being prepared in advance for commanding to execute particular processing, to the command screen, or accepts arrangement of a second object different from the first object, and a third object arranged on an other screen and to be associated with the second object, to the command screen;

a generation section that generates an application for displaying an acceptance screen on which one or both of the first object and the second object are arranged based on a result of acceptance by the acceptance section, for commanding to execute the particular processing relating to the first object when the first object is selected, and for giving notice of coordinates of the second object when the second object is selected, as the screen display application; and an output section that outputs the screen display application generated by the generation section and correspondence data indicating a correspondence between a position of the second object in the acceptance screen and the third object, and wherein the acceptance section accepts a plurality of the third object to be associated with the second object together with order of the plurality of third object, and the output section outputs data further indicating the order, as the correspondence data.

7. An application generator that generates a screen display application for causing an image forming apparatus to execute display processing for displaying a command screen on which one or more objects are arranged for giving commands, the application generator comprising:

an acceptance section that accepts arrangement of any one of a plurality of first objects each being prepared in advance for commanding to execute particular processing, to the command screen, or accepts arrangement of a second object different from the first object, and a third object arranged on an other screen and to be associated with the second object, to the command screen;

a generation section that generates an application for displaying an acceptance screen on which one or both of the first object and the second object are arranged based on a result of acceptance by the acceptance section, for commanding to execute the particular processing relating to the first object when the first object is selected, and for giving notice of coordinates of the second object when the second object is selected, as the screen display application; and an output section that outputs the screen display application generated by the generation section and correspondence data indicating a correspondence between a position of the second object in the acceptance screen and the third object, and wherein the generation section has a first template to be used when only the first object is arranged of the first object and the second object, a second template to be used when only the second object is arranged, and a third template to be used when both of the first object and the second object are arranged, and the screen display application is generated by using the first template when arrangement of only the first object is accepted of the first object and the second object by the acceptance section, the screen display application is generated by using the second template when arrangement of only the second object is accepted, and the screen display application is generated by using the third template when arrangement of both of the first object and the second object is accepted.

8. An application generation method that generates a screen display application for causing an image forming apparatus to execute display processing for displaying a command screen on which one or more objects are arranged for giving commands, the method comprising:

accepting arrangement of any one of a plurality of first objects each being prepared in advance for commanding to execute particular processing, to the command screen, or accepting arrangement of a second object different from the first object, and a third object arranged on an other screen and to be associated with the second object, to the command screen;

generating an application for displaying an acceptance screen on which one or both of the first object and the second object are arranged based on a result of acceptance, for commanding to execute the particular processing relating to the first object when the first object is selected, and for giving notice of coordinates of the second object when the second object is selected, as the screen display application; and outputting the screen display application generated and correspondence data indicating a correspondence between a position of the second object in the acceptance screen and the third object, and wherein the other screen is a screen that is used in a second application fixedly installed in advance in the image forming apparatus.

9. The application generation method according to claim 8, wherein the acceptance section displays the other screen, and accepts one selected from objects arranged on the other screen, as the third object.

10. The application generation method according to claim 8, wherein the acceptance section displays a list of the objects arranged on the other screen in a form of a hierarchical structure, and accepts one selected from the list, as the third object.

11. The application generation method according to claim 8, wherein the acceptance section displays to the command screen a message notifying that a duplicate object is about to be arranged when arrangement of the same first object is accepted a plurality of times or when the same third object is accepted a plurality of times.

12. The application generation method according to claim 8, further comprising:

an acquisition section that acquires processing name data indicating a processing name of the particular processing; and a determination section that determines whether the object accepted by the acceptance section and arranged on the screen is the first object or not, based on the processing name data, wherein the generation section generates the screen display application, based on a result of the determination section.

13. The application generation method according to claim 8, wherein the acceptance section accepts a plurality of the third object to be associated with the second object together with order of the plurality of third object, and the output section outputs data further indicating the order, as the correspondence data.

14. The application generation method according to claim 8, wherein the generation section has a first template to be used when only the first object is arranged of the first object and the second object, a second template to be used when only the second object is arranged, and a third template to be used when both of the first object and the second object are arranged, and the screen display application is generated by using the first template when arrangement of only the first object is accepted of the first object and the second object by the acceptance section, the screen display application is generated by using the second template when arrangement of only the second object is accepted, and the screen display application is generated by using the third template when arrangement of both of the first object and the second object is accepted.

15. A non-transitory recording medium storing a computer readable program to be used in a computer that generates a screen display application for causing an image forming apparatus to execute display processing for displaying a command screen on which one or more objects are arranged for giving commands, the program causing the computer to execute:

acceptance processing for accepting arrangement of any one of a plurality of first objects each being prepared in advance for commanding to execute particular processing, to the command screen, or accepting arrangement of a second object different from the first object, and a third object arranged on an other screen and to be associated with the second object, to the command screen;

generation processing for generating an application for displaying an acceptance screen on which one or both of the first object and the second object are arranged based on a result of acceptance, for commanding to execute the particular processing relating to the first object when the first object is selected, and for giving notice of coordinates of the second object when the second object is selected, as the screen display application; and output processing for outputting the screen display application generated and correspondence data indicating a correspondence between a position of the second object in the acceptance screen and the third object, and wherein the other screen is a screen that is used in a second application fixedly installed in advance in the image forming apparatus.

16. The non-transitory recording medium according to claim 15, wherein the acceptance section displays the other screen, and accepts one selected from objects arranged on the other screen, as the third object; or the acceptance section displays a list of the objects arranged on the other screen in a form of a hierarchical structure, and accepts one selected from the list, as the third object; or wherein the acceptance section displays to the command screen a message notifying that a duplicate object is about to be arranged when arrangement of the same first object is accepted a plurality of times or when the same third object is accepted a plurality of times.

17. The non-transitory recording medium according to claim 15, further comprising:

an acquisition section that acquires processing name data indicating a processing name of the particular processing; and a determination section that determines whether the object accepted by the acceptance section and arranged on the screen is the first object or not, based on the processing name data, wherein the generation section generates the screen display application, based on a result of the determination section.

18. The non-transitory recording medium according to claim 15, wherein the acceptance section accepts a plurality of the third object to be associated with the second object together with order of the plurality of third object, and the output section outputs data further indicating the order, as the correspondence data.

19. The non-transitory recording medium according to claim 15, wherein the generation section has a first template to be used when only the first object is arranged of the first object and the second object, a second template to be used when only the second object is arranged, and a third template to be used when both of the first object and the second object are arranged, and the screen display application is generated by using the first template when arrangement of only the first object is accepted of the first object and the second object by the acceptance section, the screen display application is generated by using the second template when arrangement of only the second object is accepted, and the screen display application is generated by using the third template when arrangement of both of the first object and the second object is accepted.

* * * * *